(12) United States Patent
McSweeney et al.

(10) Patent No.: US 10,360,127 B1
(45) Date of Patent: Jul. 23, 2019

(54) TECHNIQUES FOR IDENTIFYING I/O WORKLOAD PATTERNS USING KEY PERFORMANCE INDICATORS

(71) Applicant: EMC IP Holding Company LLC, Hopkinton, MA (US)

(72) Inventors: Paul McSweeney, Cork (IE); Andrea Graham, County Cork (IE); Ciara Stacke, County Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/657,582

(22) Filed: Jul. 24, 2017

(51) Int. Cl.
*G06F 11/34* (2006.01)
*G06F 3/06* (2006.01)

(52) U.S. Cl.
CPC ........ *G06F 11/3414* (2013.01); *G06F 3/0653* (2013.01); *G06F 11/3409* (2013.01); *G06F 11/3428* (2013.01); *G06F 11/3485* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,434,626 B1 * | 8/2002 | Prakash | ............... | G06F 11/3006 60/796 |
| 7,774,467 B1 * | 8/2010 | Martin | ................. | G06F 9/5011 709/201 |
| 8,335,904 B1 | 12/2012 | Kitchen et al. | | |
| 8,381,213 B1 | 2/2013 | Naamad et al. | | |
| 8,433,848 B1 | 4/2013 | Naamad et al. | | |
| 8,707,308 B1 | 4/2014 | Naamad et al. | | |
| 8,856,397 B1 | 10/2014 | Marshak et al. | | |
| 8,924,675 B1 | 12/2014 | Burke et al. | | |
| 8,954,381 B1 | 2/2015 | Naamad | | |
| 9,052,830 B1 | 6/2015 | Marshak et al. | | |
| 9,459,799 B1 | 10/2016 | Naamad | | |
| 9,521,052 B1 * | 12/2016 | Nandyalam | ............. | H04L 43/08 |
| 9,557,933 B1 | 1/2017 | Burke et al. | | |
| 9,665,288 B1 | 5/2017 | Aharoni et al. | | |
| 2003/0005119 A1 * | 1/2003 | Mercier | ................ | G06F 3/0601 709/225 |
| 2008/0059630 A1 * | 3/2008 | Sattler | ................ | G06F 9/44505 709/224 |

(Continued)

*Primary Examiner* — Raymond N Phan
(74) *Attorney, Agent, or Firm* — Muirhead and Saturnelli, LLC

(57) ABSTRACT

Techniques for identifying I/O workload patterns may include monitoring key performance indicators (KPIs) for a monitoring period; and at the end of the monitoring period, performing processing including: determining whether there have been a specified number of occurrences of a predefined event with respect to a data portion of the application, wherein the predefined event is a violation of an application KPI for the application and also a violation of at least one of a plurality of data storage KPIs for the data portion of the application; and responsive to determining that there have been the specified number of the occurrences of the predefined event with respect to the first data portion of the application, recording a pattern of I/O workload for the data portion in accordance with the occurrences of the predefined event. Hints, such as affecting data movement and/or compression, may be generated based on detected patterns.

22 Claims, 8 Drawing Sheets

(56) References Cited

U.S. PATENT DOCUMENTS

| | | | |
|---|---|---|---|
| 2009/0144518 A1* | 6/2009 | Lewis | G06F 3/0605 |
| | | | 711/171 |
| 2010/0077077 A1* | 3/2010 | Devitt | H04L 41/147 |
| | | | 709/224 |
| 2011/0029882 A1* | 2/2011 | Jaisinghani | H04L 41/12 |
| | | | 715/736 |
| 2011/0218843 A1* | 9/2011 | Goel | G06Q 10/06393 |
| | | | 705/7.39 |
| 2012/0208562 A1* | 8/2012 | Wilkin | H04L 41/12 |
| | | | 455/456.3 |
| 2016/0171414 A1* | 6/2016 | Lee | G06Q 10/06393 |
| | | | 705/7.39 |

* cited by examiner

TECHNIQUES FOR IDENTIFYING I/O WORKLOAD PATTERNS USING KEY PERFORMANCE INDICATORS

BACKGROUND

Technical Field

This application generally relates to data storage and techniques for detecting patterns of high I/O activity directed to particular storage areas or data portions.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell Inc. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of identifying I/O workload patterns comprising: monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including: determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event. The recording may include recording, for each occurrence of the specified number of occurrences, information including a date and time of said each occurrence, information identifying the first data portion, information identifying a particular one of more of the plurality of data storage KPIs that are violated, a current value of each of the particular one or more of the plurality of data storage KPIs violated, and a current value of the application KPI for the application in said each occurrence. The recording may include recording information identifying whether each occurrence of the specified number of occurrences occurred within any one or more of: a same hour, a same day, a same week and a same month. The method may include generating a hint provided as an input to a data storage optimizer, wherein the hint indicates to mark the first data portion of the application for data movement in accordance with the pattern. The hint may indicate to mark the first data portion for data movement to a first of a plurality of storage tiers. The plurality of storage tiers may be ranked from a lowest performance storage tier to a highest performance storage tier, and the first storage tier may be the highest performance storage tier. The first data portion may be a first object in a database, and the first object may include a plurality of extents. The pattern may indicate that the plurality of extents are included in a hotspot denoting high I/O workload. The pattern may include location information for each of the plurality of extents identifying a storage device location of said each extent. The step of recording may also include storing the plurality of extents of the first object in the database. The application KPI for the application may be total application I/O wait time for a specified time interval. The plurality of data storage KPIs may include any of: latency, data throughput, and I/O rate. The plurality of data storage KPIs may include a first set of KPIs for read I/O operations and a second set of KPIs for write I/O operations. The first set of KPIs may include read latency or read response time, read data throughput, and read I/O rate, and wherein the second set of KPIs may include write response time, write data throughput and write I/O rate. Each occurrence of the specified number of occurrences may require that the application KPI exceeds a first specified threshold and that the at least one of the plurality of data storage KPIs for the first data portion exceeds a second specified threshold for at least a minimum time duration. The specified number of occurrences may be at least three (3). The hint may indicate to move the first data portion to a specified one of a plurality of storage tiers for a time period in accordance with the pattern. The hint may specify a target response time for the first data portion for a time period in accordance with the pattern. Data of the first data portion may be stored in a compressed form and the hint may indicate any of: store the first data portion in an uncompressed form for a time period in accordance with the pattern; and decompress the first portion prior to an expected time period of use in accordance with the pattern.

In accordance with another aspect of techniques herein is a system comprising: one or more processors; and a memory comprising code stored thereon that, when executed by at least a first of the one or more processors, performs a method of identifying I/O workload patterns comprising: monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including: determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event.

In accordance with another aspect of techniques herein is a computer readable medium comprising code stored thereon that, when executed, performs a method of identifying I/O workload patterns comprising: monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including: determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event. The recording may include recording, for each occurrence of the specified number of occurrences, information including a date and time of said each occurrence, information identifying the first data portion, information identifying a particular one of more of the plurality of data storage KPIs that are violated, a current value of each of the particular one or more of the plurality of data storage KPIs violated, and a current value of the application KPI for the application in said each occurrence. The recording may include recording information identifying whether each occurrence of the specified number of occurrences occurred within any one or more of: a same hour, a same day, a same week and a same month. The method may include generating a hint provided as an input to a data storage optimizer, wherein the hint may indicate to mark the first data portion of the application for data movement in accordance with the pattern.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
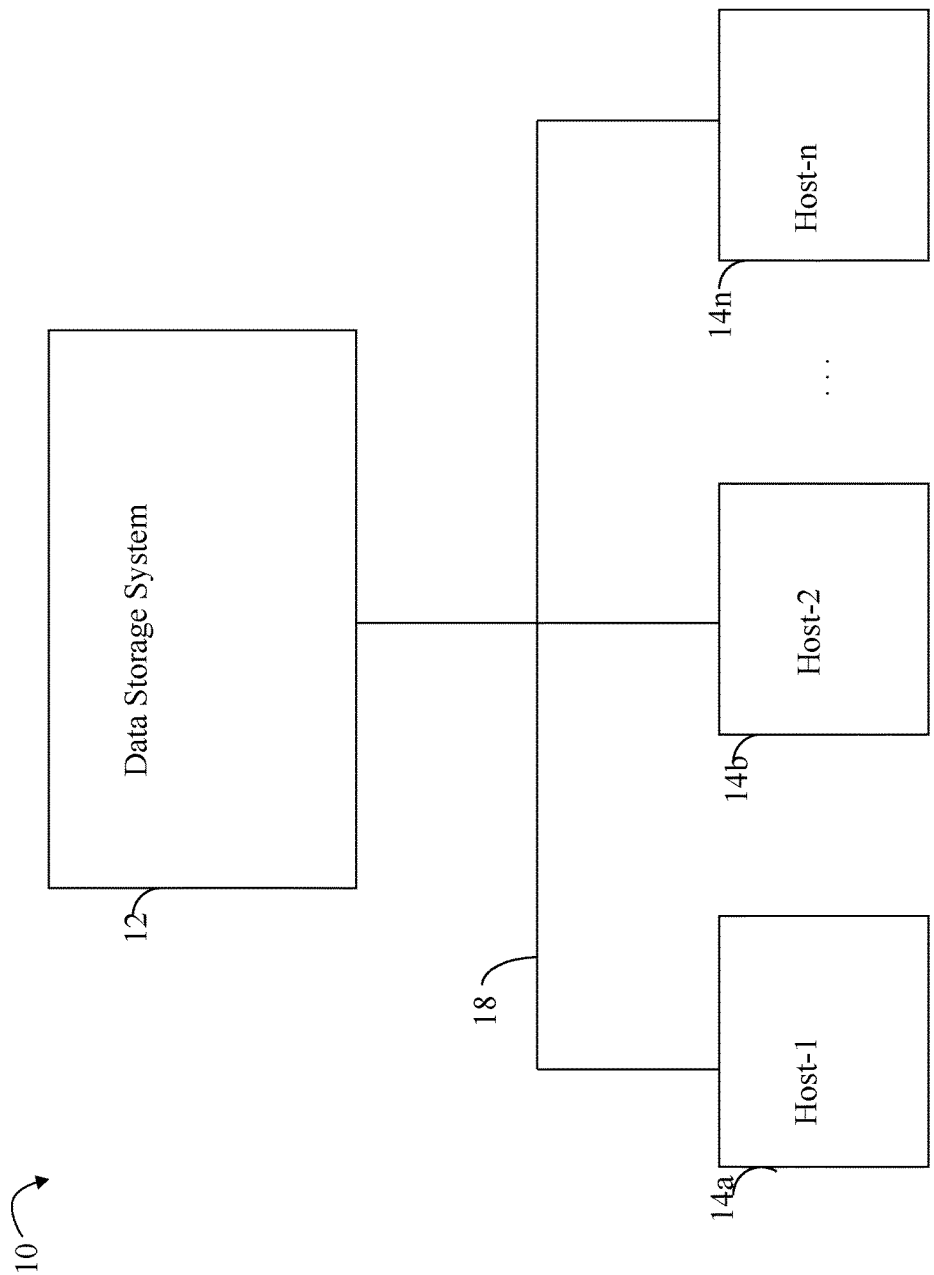
FIG. 1 is an example of an embodiment of components that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, Infiniband (IB), as well as, more generally, any suitable file-based protocol or block-based protocol. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Dell's Symmetrix® VMAX® data storage system, as well one or more other data storage systems as may vary with the embodiment.

Figure 2A:
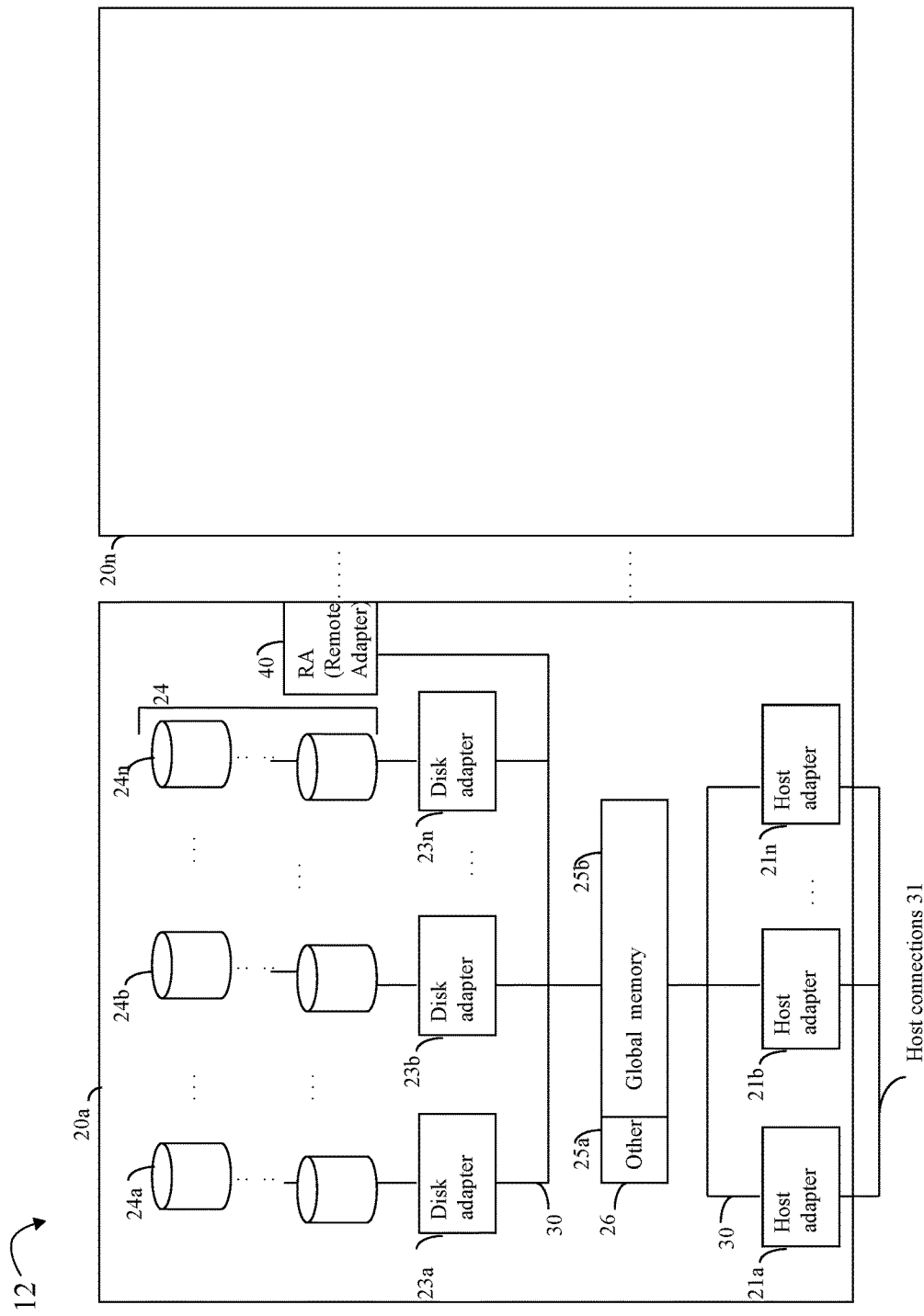
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two data storage systems.

The system 20a may also include one or more host adapters ("HAs") or directors 21a-21n. Each of these HAs may be used to manage communications and data operations between one or more host systems and the global memory 25b. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by Dell Inc., various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
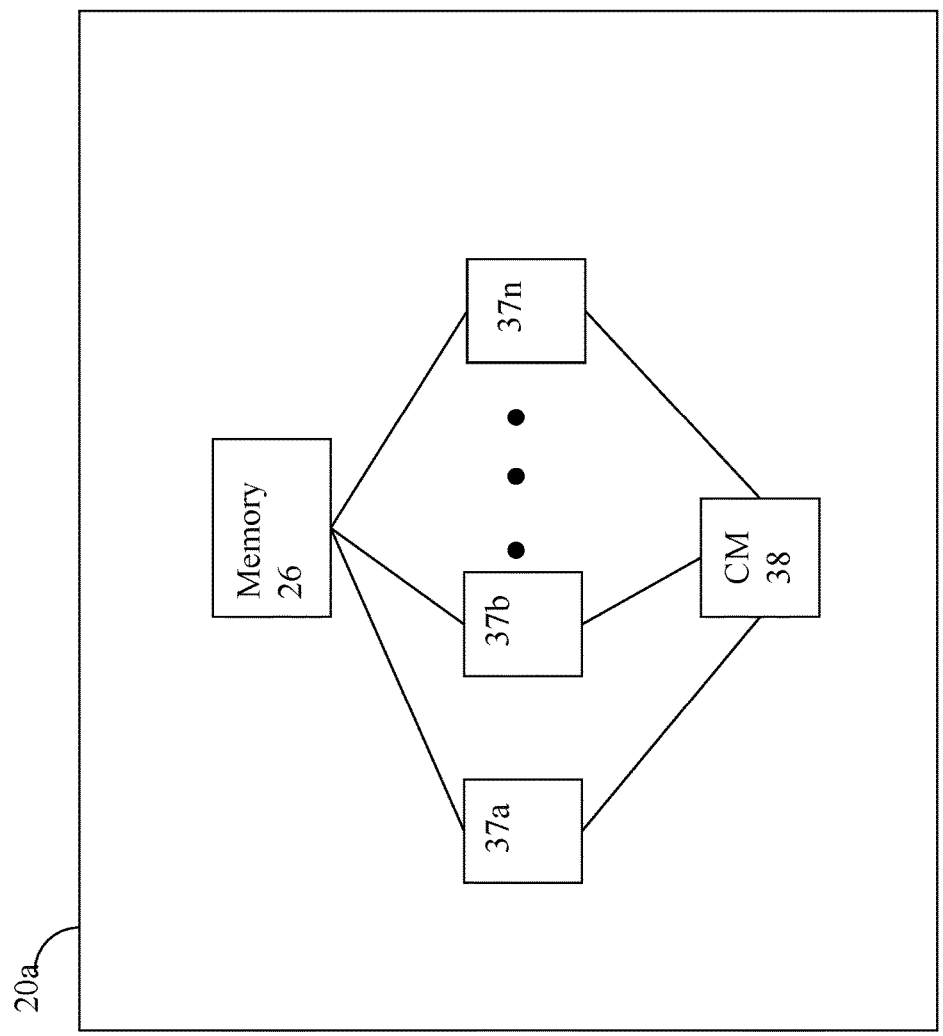
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

In at least one embodiment in accordance with techniques herein, the data storage system may include multiple storage tiers of PDs. For example, an embodiment may include a first storage tier of flash drives, a second storage tier of 15K RPM rotating disk drives and a third storage tier of 10K RPM rotating disk drives. In such an embodiment, the foregoing 3 tiers may have a relative performance ranking, from highest performance to lowest performance, wherein the first storage tier of flash drives has the highest performance ranking, the second storage tier has the second or intermediate performance ranking, and the third tier has the lowest performance ranking. It should be noted that an embodiment in accordance with techniques herein may include any suitable number of storage tiers of any suitable physical storage devices, such as any suitable form of non-volatile data storage.

In at least one embodiment in accordance with techniques herein, a data storage system with multiple storage tiers of PDs may also include a data storage optimizer as well as other components to perform other data storage services. The data storage optimizer (also referred to herein as optimizer) may perform data storage optimizations to enhance and improve the performance of I/O operations, such as those I/O operations associated with data storage devices 16a-16n of the system 12. The data storage optimizer may be, for example, the Fully Automated Storage Tiering (FAST) product by Dell Inc. The optimizer may take into consideration various types of information, such as hints (described in more detail elsewhere herein), performance data, and the like, in an attempt to optimize particular metrics associated with performance of the data storage system 12. The optimizer may access the performance data, for example, collected for a plurality of LUNs when performing a data storage optimization. The performance data may be used in determining a workload for one or more physical devices, logical devices or LUNs, portions of logical devices or LUNs, and the like. The I/O workload directed to a particular entity (e.g., LUN or data portion) may also be a measurement or level of "how busy" the entity is, for example, in terms of I/O operations (e.g., I/O throughput such as number of I/Os/second, response time (RT), and the like).

The optimizer may perform processing for automated evaluation and movement of data including such automated promotion and demotion of data portions between different storage tiers. Data portions may be automatically placed in a storage tier where the optimizer has determined the storage tier is best to service that data in order to improve data storage system performance. The data portions may also be automatically relocated or moved to a different storage tier as the work load and observed performance characteristics for the data portions change over time. Such techniques herein may take into account how "busy" the data portions are (e.g., such as based on one or more I/O workload metrics such as I/O throughput or I/Os per unit of time, response time, utilization, and the like) associated with a storage tier in order to evaluate which data to store on drives of the storage tier. An embodiment of the optimizer in accordance with techniques herein may use such workload information that may characterize a current or recent workload activity for data portions. Additionally, the optimizer may use other information, such as hints, to identify data portion candidates for data movement optimization processing (e.g., for promotion and/or demotion). Generation and use of hints, such as may be provided to the data storage optimizer in at least one embodiment in accordance with techniques herein, is described in more detail in following paragraphs.

The optimizer may perform data storage optimization processing such as, for example, data movement optimization processing to determine what particular data portions of devices to store on physical devices of a particular tier, evaluate when to move data between physical drives of different tiers, and the like. Such decisions regarding data movement and placement of data portions on particular storage tiers may take into account a variety of different factors including I/O workload of the data portions, required performance or service levels of the data portions and/or LUNs, and the like. For example, the optimizer may place data portions (e.g., sub-LUN size data portions) with the highest I/O workloads on the highest performance tier.

Additionally, the optimizer may periodically reassess current I/O workload and other conditions existing in the data storage system at different points in time and may automatically relocate data portions to different storage tiers in accordance with changing conditions, such as varying I/O workloads of the data portions, at different points in time. For example, a data portion having a high I/O workload at a first point in time may be located in the flash tier. At a later point in time, the data portion's workload may decrease or be idle whereby the data portion may be automatically relocated by the optimizer to a lower/lowest performance tier, such as a PD of the 10K RPM disk drive tier or 15K RPM disk drive tier.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of rotating disk drives may be characterized as a demotion, and movement of data from the foregoing second tier to the first tier a promotion. Thresholds may be used in connection with promotion and demotion of data portions in connection with data movement optimizations.

Described in following paragraphs are techniques that may be used for pattern detection for preemptive management of data portions. Such techniques may be used to detect patterns of recurring application I/O spikes or periods of high I/O workload (e.g., exceeding specified levels or thresholds) in combination with particular data portions (e.g., used by the application/to which I/Os issued by the application are directed) having high I/O workload. In other words, techniques herein detect patterns of event occurrences where each event occurrence may include a violation of an application specific metric in combination with a violation of one or more storage specific metrics (e.g., related to a particular data portion to which the application issues I/O operations). In one aspect, such an event occurrence may be characterized as a predefined event where there is a simultaneous violation of the application specific metric and also a violation of one or more storage specific metrics of a particular data portion. An embodiment may detect a pattern when at least a specified number of such event occurrences are observed. In at least one embodiment in accordance with techniques herein, a hint may be generated in accordance with the detected pattern. The hint may be provided as an input to another component, such as the data storage optimizer.

At least one embodiment in accordance with techniques herein may be used in connection with objects of a database where each object may correspond to a data portion. In such an embodiment, each object may include (or map to) one or more extents. The one or more extents of an object may more generally refer to one or more smaller or sub data portions of the object. As known in the art, the size and data of a single object may vary over time as modifications are made to the object. In this manner, the amount of data associated with the single object may vary over time based on the modifications whereby data storage for the object may be accordingly allocated and deallocated over time. An extent may correspond to a chunk of storage allocated for use, or associated with, an object. As the size of the object grows due to additional data added to the object, additional extents may be allocated and mapped to the object (whereby such extents are used to store the additional data of the object). In a similar manner, if the size of the object decreases such as due to data modifications of the object data, one or more extents may be deallocated or unmapped from the object. In such an embodiment, information may be stored an available in the data storage system regarding such mapping between objects and extents of the different objects. In at least one embodiment, the objects may be objects of an object database. The objects may be stored on the data storage system. An application on a host may issue I/Os to various objects of the database.

Figure 3:
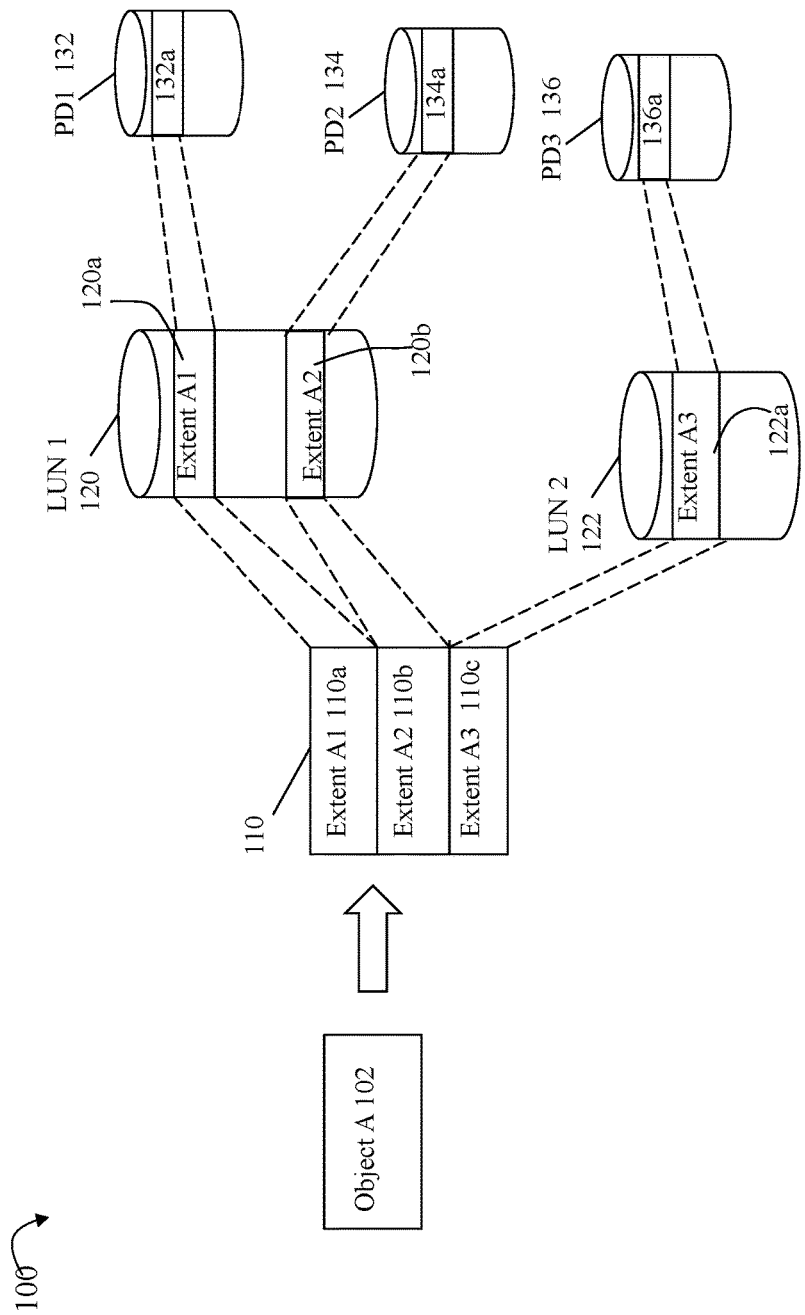
FIG. 3 is an example illustrating mappings between an object, its extents and allocated storage in an embodiment in accordance with techniques herein.

Referring to FIG. 3, shown is an example illustrating object to extent mapping in an embodiment in accordance with techniques herein. The example 100 includes an object A 102 which is mapped to 3 extents 110a-c. Thus, extents 110 store the data for object A 102. An I/O from an application (such as on a host) may be directed to a particular object such as object A 102. On the data storage system, the extents 110 are further mapped to underlying allocated physical storage. In this example, extent 110a may be located on LUN1 120 at offset or logical address location 120a, extent 110b may be located on LUN1 120 at offset or logical address location 120b, and extent 110c may be located on LUN2 122 at offset or logical address location 122a. Consistent with discussion elsewhere herein, each of the logical address locations 120a, 120b and 122a may be further mapped to underlying allocated physical storage device locations on PDs 132, 134 and 136. In this example, 120a is mapped to PD location 132a, 120b is mapped to PD location 134a and 122a is mapped to PD location 136a.

As described above, an embodiment in accordance with techniques herein may store information regarding the object-extent mapping from 102 to 110a-110c whereby such mapping information identifies the particular logical device locations 120a, 120b, and 122c of the respective extents 110a-110c of the object A 102. In such an embodiment, the particular logical device locations 120a, 120b, and 122c may be mapped to respective physical storage locations 132a, 134a and 136a at a first point in time. In at least one embodiment, the management or mapping of particular logical device locations 120a, 120b, and 122c to the respective physical storage locations 132a, 134a and 136a may be determined under the management and control, for example, of the data storage optimizer as described elsewhere herein. Thus, consistent with description elsewhere herein, at a later point in time, the optimizer may also relocate data of extents 110 stored at logical device locations 120a, 120b, and 122c to other different PDs of different storage tiers. As further described in more detail in accordance with techniques herein, a hint may generated based on a detected pattern of high application workload and also high workload directed to object A 102. The hint may include information about the particular time period (e.g., particular time of day, particular day of week) during which the detected pattern occurred. Additionally the hint may identify the particular extents 110a-110c of the object A 102 and associated logical device locations 120a, 120b and 122a. The hint may also identify or request that the optimizer perform a particular data movement optimization. In this manner, the data storage optimizer may use information of the hint regarding a prior detect pattern of high I/O workload of object A 102 to proactively perform a data movement optimization, such as a data promotion of extents 110a-c to flash storage PDs, prior to the next expected occurrence of the high I/O workload of object A 102.

Thus, in at least one application or use of techniques herein, recognition of a storage utilization pattern of a detected "hotspot" with respect to a particular object having high I/O workload may be used to provide a hint to the data storage optimizer. The optimizer may then use information of the hint to proactively perform an appropriate data movement optimization prior to the next expected high I/O workload, or next expected occurrence of the detected pattern. The foregoing and other aspects of techniques herein and applicable uses of such techniques are described in more detail in following paragraphs.

In accordance with techniques herein, a detection method may be utilized by which repeated storage hotspots related to application objects may be discovered. Application objects that repeatedly exceeds a specified application I/O wait time threshold and also exceed one or more other storage thresholds over a defined time period are detected. Hints may be generated and used based on such detected patterns to take preemptive action to improve performance of the data storage system. Techniques herein monitor and evaluate various metrics or key performance indicators (KPIs) including storage metrics in combination with an application specific metric to determine patterns of high I/O workload and activity at the object level.

In at least one embodiment in accordance with techniques herein, metrics or KPIs used may include application I/O wait time as the application specific metric. Additionally the metrics or KPIs may also include the following storage metrics as related to each object (or more generally each data portion): I/O latency or I/O response time (e.g., as measured from the data storage system side or perspective), data throughput (e.g, amount of data per unit of time such as 20 MB (megabytes) per second), and I/O rate (e.g., I/Os per second or IOPS).

The application I/O wait time may be a total or cumulative amount of time that an application waits for I/Os to complete. The application I/O wait time may be measured on the host/application side. The total application I/O wait time used as a KPI in an embodiment in accordance with techniques herein may be defined as the measure of the total time that the application processes are blocked and waiting for I/Os to complete. For example, the application on a host issues an I/O to the data storage system and it takes N milliseconds for the application/host to receive an acknowledgement regarding I/O completion from the data storage system. The total application I/O wait time, or simply application wait time, used as a KPI herein may denote the cumulative or total amount of such wait time spanning multiple I/Os issued by the application over a defined time period, such as over the course of an hour.

In at least one embodiment, the storage metrics may include a first set of storage metrics maintained with respect to read I/O operations (e.g., read latency or response time, read data throughput, and read I/O rate such as read I/Os per second (IOPS)) and second set of storage metrics maintained with respect to write I/O operations (e.g., write latency or response time, write data throughput, and write I/O rate such as write I/Os per second (IOPS)). Such sets of storage metrics may be maintained separately for each object (e.g., a separate or individual set of read I/O storage metrics for each data portion and also a separate or individual set of write I/O storage metrics for each data portion). In at least one embodiment, the foregoing storage metrics may be monitored for a time period and may be averages of observed values of the metrics for the time period. For example, the time period may be an hour where the storage metrics may be observed or collected for an object every second of the hour. The read latency or read I/O KPI for the object may be an average read I/O response time or latency determined for read I/Os directed to the object during the hour (e.g., the single monitoring period). As a variation, the read latency or read I/O KPI (or more generally any KPI) of the object may be the maximum observed value of the KPI during the time period. For example, consider again an embodiment which monitors object level KPIs for an object each second over the course of an hour, the read latency or read I/O KPI may be a maximum observed value (collected each second) in an ongoing manner over the hour time period.

Latency or response time may be measured on the data storage system side (e.g., for an I/O received on the data storage system, latency or response time may denote the amount of time it takes for the I/O processing on the data storage system to complete, or until an acknowledgement regarding I/O completion can be returned to the host/application). For read operations, latency or response time may include the amount of time to obtain the requested read data from cache (e.g., for read hit) or from physical storage (e.g., obtain from back-end non-volatile storage for read miss). In at least one embodiment, data of a write operation may be stored in cache. At a later point in time, the write data stored in cache may be written out to physical non-volatile storage. In such an embodiment, an acknowledgement regarding completion of the write operation may be returned to the application/host once the write data has been stored in cache. Thus, the write latency or response time may generally be expected to be much smaller than read latency or response time.

Data throughput or throughput may be the amount of data transferred per unit of time. For example, read throughput is the amount of data transferred in connection with read I/O operations directed to a single object, and write throughput is the amount of data transferred in connection with write I/O operations directed to a single object.

In connection with each of the KPIs, a threshold may be specified. A violation of a particular KPI's threshold may characterized as when the particular KPI exceeds or breaks its associated threshold.

In connection with the storage KPIs, an embodiment may specify a duration or length of time the storage KPI must continuously break or exceed its associated threshold in order to be considered a storage KPI violation.

An embodiment may define an event as a simultaneous occurrence of the application KPI violation in combination with an occurrence of at least one storage KPI violation for an object. An embodiment may define a pattern as a detection that such an event has occurred, with respect to a single object, a specified number of times. For example, in one embodiment, the specified number of times may be three (3), may be at least 3, may be at least 2, and the like.

Figure 4A:
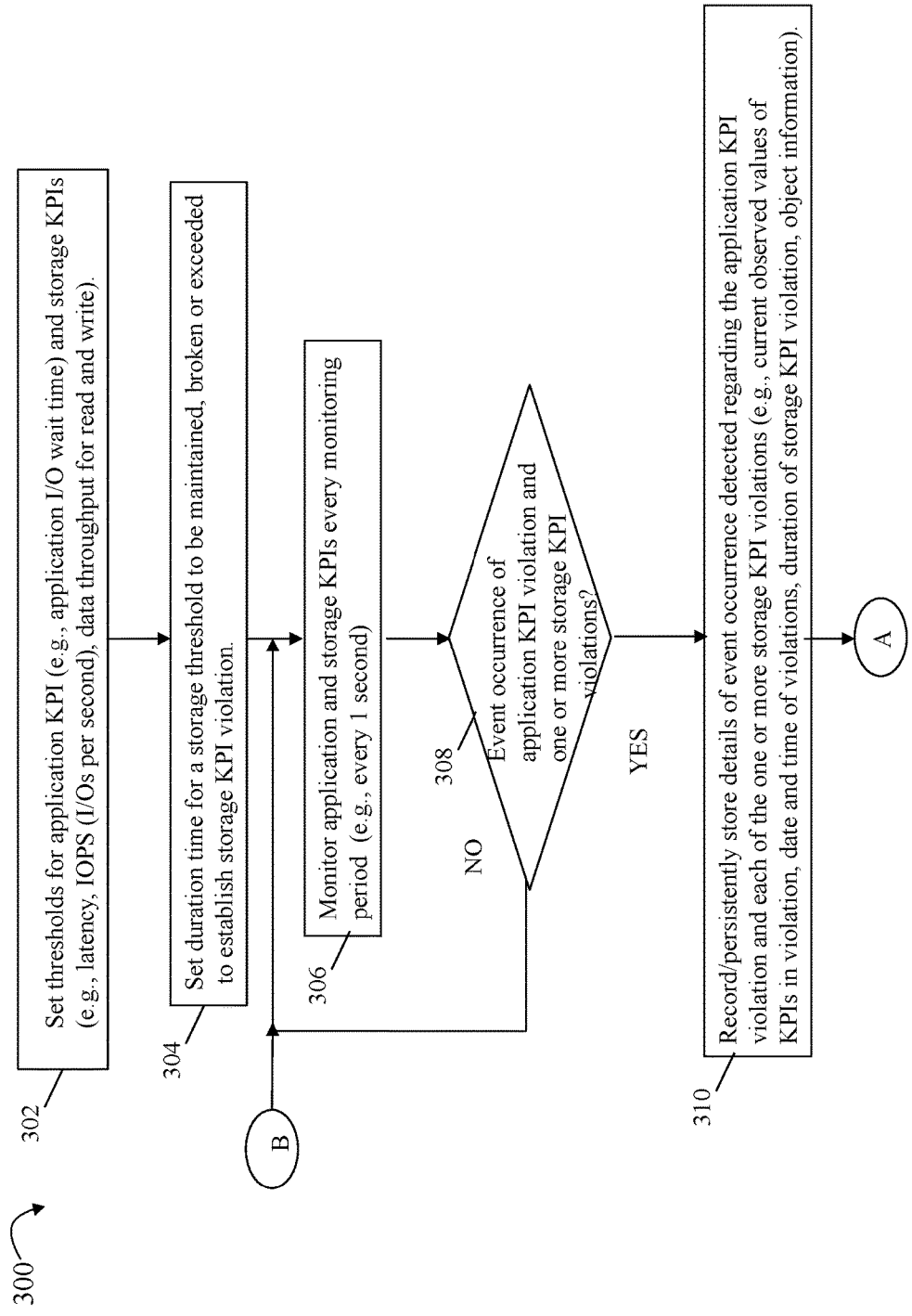
FIGS. 4A-4B are flowcharts of processing steps that may be performed in an embodiment in accordance with techniques herein.
Figure 4B:
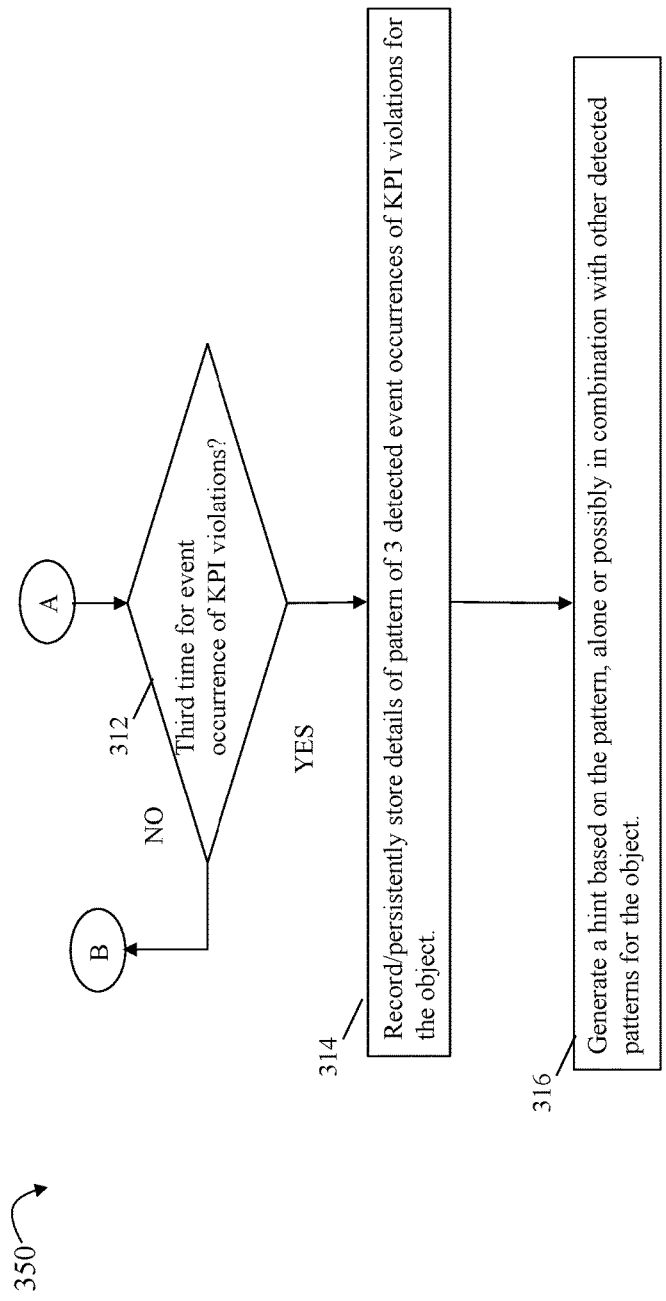

Referring to FIGS. 4A and 4B, shown are flowcharts 300 and 350 of processing steps that may be performed in an embodiment in accordance with techniques herein. The steps of FIGS. 4A and 4B generally summarize processing as just described above. In step 302, thresholds may be set for the application KPI and the storage KPIs. Step 302 may include, for example, setting different thresholds for each of the following KPIs used in one embodiment as described herein: application I/O wait time threshold, latency or RT threshold for read, latency or RT threshold for write, data throughput threshold for read, data throughput threshold for write, IOPS (I/Os per second) threshold for reads, IOPS (I/Os per second) threshold for writes. At step 304, a duration time may be set for which a storage threshold is to be maintained, broken or exceeded in order to establish a KPI violation. The thresholds and duration time set, respectively, in steps 302 and 304 may be specified for a single application having its associated application objects stored on the data storage system. Subsequent steps beginning with step 306 may be performed with respect to each object to which the application sends read and/or write I/Os.

At step 306, the application and storage KPIs may be monitored per object every monitoring time period, such as every second. At step 308, a determination is made as to whether an event occurrence is detected for an object during the particular monitoring period of 1 second where an application KPI violation has occurred in combination with one or more storage KPI violations for an object. Consistent with discussion elsewhere herein, in at least one embodiment, step 308 determines whether the application I/O wait time KPI exceeds the specified application I/O wait time threshold and also whether at least one of the storage KPIs for an object exceeds its associated threshold for at least the specified duration time. If step 308 evaluates to no, control proceeds to step 306 to await the next occurrence of the next monitoring period, such as the next second. If step 308 evaluates to yes, control proceeds to step 310.

At step 310, processing may be performed to record or persistently store details of the event occurrence detected (as a result of step 308 evaluating to yes) regarding the application KPI violation and each of the one or more storage KPI violations for the particular object. Step 310 may include recording the current observed values of the KPIs in violation, date and time of the event and associated KPI violations, duration of storage KPI violation, information regarding the particular object and its associated one or more extents experiencing the event occurrence and associated KPI violations, and the like. Regarding the object extents, step 310 may include storing location information such as the LUN and logical address or offset at which each extent is stored.

From step 310, control proceeds to step 312 where a determination is made as to whether this is the third such detected even occurrence of KPI violations for the same object. For example, is this the third time that step 308 has evaluated to yes for the same object? If so, then step 312 evaluates to yes; and otherwise step 312 evaluates to no. If step 312 evaluates to no, control proceeds back to step 306. If step 312 evaluates to yes, control proceeds to step 314. It should be noted that step 312 indicates detecting 3 occurrences of KPI violations for the same object (e.g., application KPI violation in combination with at least one storage KPI violation for the same object). However, more generally, an embodiment may specify any suitable number of occurrences that may trigger detection or determination of a pattern thereby causing step 312 to evaluate to yes.

At step 314, processing may be performed to record or persistently store details regarding the pattern of 3 detect event occurrences of the KPI violations for the particular object. Such information recorded in step 314 may include information similar to that as described in connection with step 310. Additionally, step 314 may include storing additional information regarding the detected pattern and 3 event occurrences detected. For example, step 314 may include further analysis such as whether the 3 events detected occurred in the same hour, the same day, the same week, the same month, and the like. Generally, step 314 may include additional pattern information such as regarding the time interval during which the 3 detected event occurrences took place for the particular object. For example, the 3 detected event occurrences of the application KPI violation in combination with at least one storage KPI violation for the particular object may occur: in the same hour, such as between 3-4 pm for 3 different days; in the same hour but on different days in the same week of the same month; at different hours or times of day but all within the same week; and the like. Control proceeds from step 314 to step 316.

At step 316, processing may be performed to generate a hint based on the pattern alone or possibly in combination with other detected patterns for the object. For example a first recorded pattern may indicate 3 detected event occurrences for a first object on Monday during the first week of January; a second recorded pattern may indicate 3 detected event occurrences for the first object on Wednesday also during the first week of January; and a third recorded pattern may indicate 3 detected event occurrences for the first object on Thursday also during the first week of January. In a similar manner, other recorded patterns may indicate 3 detected event occurrences during the first week of each month of the same year. Thus, step 316 may also include performing additional historical pattern analysis over longer periods of time, such as months or one or more years. Based on the foregoing example, a hint may be generated which indicates that the first object experiences high/heaving I/O workload regularly during the first week of each month and may accordingly generate a hint. As discussed elsewhere herein, such a hint may be provided as an input to another component, such as the data storage optimizer, for subsequent use by the component.

In at least one embodiment, information recorded for each detected event in step 310 and also each detected pattern in step 314 may be stored in a database. In at least one embodiment in connection with step 310 and/or 314, processing may also include storing, in the database, the storage extents related to the object (experiencing the pattern of KPI violations).

It should be noted that an embodiment in accordance with techniques herein may perform processing as described herein, such as illustrated in connection with FIGS. 4A and 4B, using any suitable number and type of application KPI and storage KPI. For example, an embodiment may use a single application KPI, such as total I/O wait time and only read KPIs (no write KPIs). As a variation, an embodiment may use a single application KPI, such as total I/O wait time and only write KPIs (no read KPIs). As yet another variation, an embodiment may use a single application KPI, such as total I/O wait time and a portion of the read KPIs and write KPIs described herein.

As a further example illustrating use of techniques herein, consider a database application that uses the following KPIs as described herein: application I/O wait time, and 3 read storage KPIs of read latency, read data throughput, and read IOPS. However, no write storage KPIs are used. Additionally, the application has the following thresholds an duration time:

Total I/O wait time threshold for 1 hour=60 seconds;
Read IOPS (read I/Os per second rate) threshold (e.g., average reads/second)=1000;
Read latency threshold (e.g., average read latency)=10 ms (milliseconds);
Read data throughput threshold (e.g., average amount of read data per second)=20 MBps (megabytes per second); and
Duration time=5 seconds.

Assume in this example that one of the 1-second monitoring periods determines observed values for some of the KPIs as follows: total I/O wait time=70 seconds and read latency for object X was 12 ms. and lasted 6 seconds. In this case, the foregoing results in step 308 evaluating to yes whereby an event occurrence of the application KPI violation and one storage KPI violation for read latency is detected. Step 310 may be performed whereby the information recorded may identify the extents of object X and also the location (e.g., LUN, offset/logical address) of each extent of object X.

Figure 5:
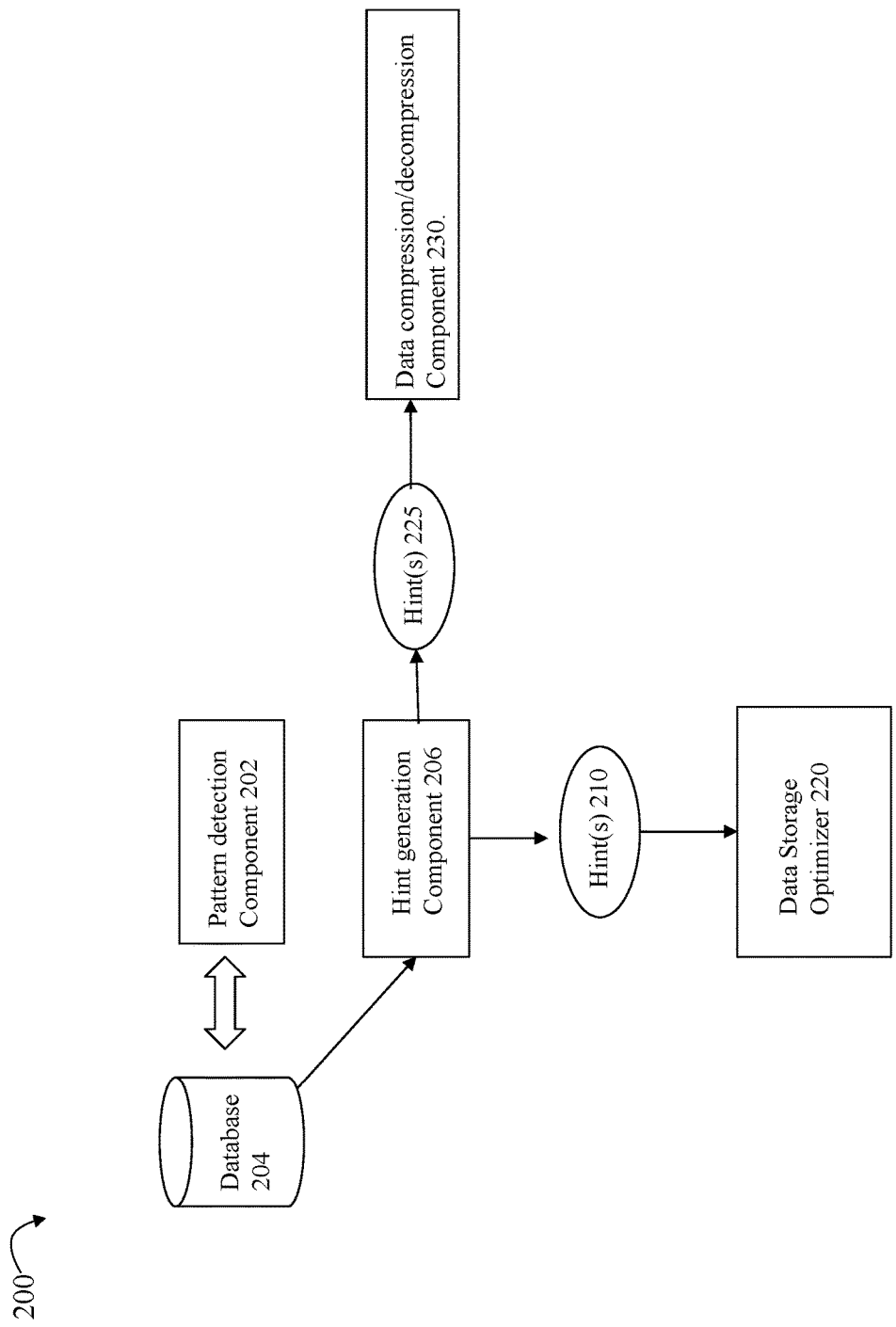
FIG. 5 is an example of components and data flow illustrating generation and use of hints in an embodiment in accordance with techniques herein.

Referring to FIG. 5, shown is an example of components that may be used in an embodiment in accordance with techniques herein. The example 200 includes database 204, pattern detection component 202, hint generation component 206, data storage optimizer 220 and data compression/decompression component 230. The database 204 may include information regarding the various detected event occurrences of the KPI violations (e.g., step 310) and also detected patterns (e.g., step 314). The pattern detection component 202 may, for example, denote the component that performs processing of steps 312 and 314 of FIG. 4B. The hint generation component 206 may perform the processing, for example, of step 316.

Consistent with discussion herein, the hint generation component 206 may generate hints provided as inputs to one or more other components, such as 220 and/or 230. Element 210 may denote the one or more hints output to a first component, the data storage optimizer 220. Element 225 may denote the one or more inputs output to a second component, the data compression/decompression component 230. As discussed below the data compression/decompression component 230 may perform processing to compress and also decompress data. In at least one embodiment, data may be stored on backend non-volatile PDs in a compressed form. As such, the component 230 may perform processing to decompress data (e.g., such as in connection with reading data stored in a compressed form from the backend non-volatile PDs), and also to compress data (e.g., such as in connection with writing/storing data to the backend non-volatile PDs where such data is stored in a compressed form).

As discussed above, the optimizer 220 may perform processing such as, for example, data movement optimization processing to determine what particular portions of devices to store on physical devices of a particular tier, evaluate when to move data between physical drives of different tiers, and the like. In connection with techniques described herein, the hint generation component 206 may perform processing to generate hints for one or more selected data portions. As illustrated in FIG. 5, such hints 210 may be provided by the hint generation component 206 to the optimizer 220 for use in connection with data storage optimization processing. Inputs to the hint generation component 206 may include detected event occurrences regarding KPI violations and detected patterns as stored in the database 204. Hint generation may be based on objects or other data portions of the database 204. In an exemplary embodiment described herein, hints may be generated for data portions which are objects although techniques herein may be more generally used in connection with generating hints for data entities or data portions besides objects. For example, a hint 210 may be provided identifying one or more time periods of high or heavy I/O workload activity for an object based upon a recorded pattern in step 314 for the object. The hint 210 may provide information identifying the location of the different extents of the object and whether for the identified time periods the data portion may be a candidate for promotion to a particular high performance storage tier, such as a flash-based storage tier.

In at least one embodiment, hints 210 provided to the optimizer 220 may be one of a defined set of different priorities or hint types. For example, priority 1 hints may indicate to promote the specified object to the highest performance storage tier, such as flash-based storage tier, for an amount of time and for the particular time period (e.g., date and time) identified in the hint. As yet a further generalization, the hint may specify to store the specified object's data in a particular storage tier and is not limited to specifying flash storage tier. For example, in a system having N storage tiers ranked from highest "1" to lowest "N", the hint may indicate to store the object data in a mid-ranked storage tier identified by a particular ranking number between 1 and N, inclusively; by identifying a particular storage tier technology or type (e.g., flash, rotating disk drive with particular speed or RPM minimum rating such as 15 K RPM drives), and the like. Priority 2 hints may specify a target performance goal or objective, such as a target responsive time (RT) to be achieved for the object as another way of improving performance for the object. Additionally, specifying a target goal or objective (e.g., target RT) for the object may further assist in meeting another type of target goal or objective of the application, such as a specified service level objective (SLO) that may be associated with a logical device or other storage entity for the application. An SLO as known in the art may specify a performance goal or objective, such as in terms of an expected average I/O RT. For example, meeting a specified target RT for the object having several extents stored on a LUN may also facilitate improving the overall I/O RT for the LUN having a specified SLO. The hint may specify a target RT for the object whereby, for example, it is a target or goal to have the average observed I/O RT for I/Os directed to the object be less than the specified target RT. The optimizer 220 may perform data movements in order to have an average I/O RT for the object meet the specified target RT for the object, where the specified target RT may be as identified in the priority 2 hint. As such, priority 1 hints may cause immediate promotion to the highest performance tier; and priority 2 hints do not specify direct promotion to a particular storage tier but rather allow the optimizer to select suitable data movements in order to achieve the desired target RT (e.g., performance goal or objective) for the object as specified in the priority 2 hint.

As another example, one or more hints 225 may be generated and provided as input to a data compression/decompression component 230. In at least one embodiment, application objects may be stored in any suitable compressed format. As such, when an I/O is directed to such a compressed object, it may be necessary to obtain the data in an uncompressed or decompressed form as part of servicing the I/O operation. For example, to service a read operation (cache miss) that reads an object stored in a compressed form, the object's data stored in a compressed form may be obtained from non-volatile backend PDs, decompressed and stored in cache, and returned in decompressed form to the requesting application that issued the read operation. As such, to improve performance, it may be desirable to identify periods of high I/O workload for an object, such as based on detected patterns in step 314, and generate a hint 225 to the component 230 to possible decompress the affected object prior to such high I/O workload time periods. The hint 225 may indicate for the affected object to decompress the object's data prior to an expected time period of use in accordance with the pattern. For example, the hint 225 may indicate for the object an hour of each day, from 4-5 pm., during which step 312 detected 3 event occurrences of KPI violations. As such, prior to 4 pm., the component 230 may obtain the object data and store the object's data in an uncompressed/decompressed form so that such decompression processing of the object has been performed prior to the identified pattern of expected high I/O workload. Also in accordance with the detected pattern, the component 230 may store the object in its decompressed/uncompressed form for a time period of 1 hour, from 4-5 pm. each day.

Figure 6:
FIG. 6 is an example illustrating information that may be included in a hint in an embodiment in accordance with techniques herein.

Referring to FIG. 6, shown is an example 400 of information that may be included in a hint, such as may be provided to the optimizer 220 and/or compression/decompression component 230. A hint may include location information for storage extents 410. For example, with reference back to FIG. 3, the LUN and associated offset of logical address for each extent may be stored in the hint to thereby identify all data of the affected object identified by the hint. The hint may also identify a time period 420 of the detected pattern 420. The time period 420 may, for example, be a one-time or single occurrence hint and therefore identify a start date and time and an end date and time of the hint. The time period 420 may identify whether the hint should be applied in an ongoing or recurring manner. For example, the time period 420 may identify a recurrence pattern of daily (e.g., occurs on daily basis and identifies one or more hours each day to apply the hint), weekly (e.g., occurs weekly and identifies one or more days of the week and possibly particular times of such days when the hint applies), monthly (e.g., occurs monthly and identifies particular day or days of the month and possibly hours of such days when the hint applies), and the like. The additional hint information 430 may vary with the particular hint. For example, for a data storage optimizer hint, the additional hint information 430 may indicate the particular priority of hint as discussed above. If the hint is a priority 2 hint, the additional hint information 430 may also include a specified target RT (e.g., average I/O RT) to be applied for the hint.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of identifying I/O workload patterns comprising:

monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including:

determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event, and wherein the first data portion is a first object in a database, and the first object includes a plurality of extents, and wherein the pattern indicates that the plurality of extents are included in a hotspot denoting high I/O workload, the pattern including location information for each of the plurality of extents identifying a storage device location of said each extent, and wherein said recording includes storing the plurality of extents in the database.

2. The method of claim 1, wherein said recording includes:

recording, for each occurrence of the specified number of occurrences, information including a date and time of said each occurrence, information identifying the first data portion, information identifying a particular one or more of the plurality of data storage KPIs that are violated, a current value of each of the particular one or more of the plurality of data storage KPIs violated, and a current value of the application KPI for the application in said each occurrence.

3. The method of claim 1, wherein the application KPI for the application is total application I/O wait time for a specified time interval.

4. The method of claim 1, wherein the plurality of data storage KPIs include any of: latency, data throughput, and I/O rate.

5. The method of claim 1, wherein each occurrence of the specified number of occurrences requires that the application KPI exceeds a first specified threshold and that the at least one of the plurality of data storage KPIs for the first data portion exceeds a second specified threshold for at least a minimum time duration.

6. The method of claim 2, wherein said recording includes recording information identifying whether each occurrence of the specified number of occurrences occurred within any one or more of: a same hour, a same day, a same week and a same month.

7. The method of claim 5, wherein the specified number of occurrences is at least three (3).

8. A method of identifying I/O workload patterns comprising:

monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including:

determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event, and wherein said recording includes:

recording, for each occurrence of the specified number of occurrences, information including a date and time of said each occurrence, information identifying the first data portion, information identifying a particular one of more of the plurality of data storage KPIs that are violated, a current value of each of the particular one or more of the plurality of data storage KPIs violated, and a current value of the application KPI for the application in said each occurrence, and wherein the method further includes:

generating a hint provided as an input to a data storage optimizer, wherein the hint indicates to mark the first data portion of the application for data movement in accordance with the pattern.

9. The method of claim 8, wherein the hint indicates to mark the first data portion for data movement to a first of a plurality of storage tiers.

10. The method of claim 8, wherein the hint indicates any of:

move the first data portion to a specified one of a plurality of storage tiers for a time period in accordance with the pattern; and specifies a target response time for the first data portion for a time period in accordance with the pattern.

11. The method of claim 9, wherein the plurality of storage tiers are ranked from a lowest performance storage tier to a highest performance storage tier, and the first storage tier is the highest performance storage tier.

12. A method of identifying I/O workload patterns comprising:

monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including:

determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event, wherein the plurality of data storage KPIs include any of: latency, data throughput, and I/O rate and wherein the plurality of data storage KPIs include a first set of KPIs for read I/O operations and a second set of KPIs for write I/O operations.

13. The method of claim 12, wherein the first set of KPIs includes read latency or read response time, read data throughput, and read I/O rate, and wherein the second set of KPIs includes write response time, write data throughput and write I/O rate.

14. The method of claim 9, wherein data of the first data portion is stored in a compressed form and the hint indicates any of:
store the first data portion in an uncompressed form for a time period in accordance with the pattern; and
decompress the first portion prior to an expected time period of use in accordance with the pattern.

15. A system comprising:
one or more processors; and
a memory comprising code stored thereon that, when executed by at least a first of the one or more processors, performs a method of identifying I/O workload patterns comprising:
monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and
at the end of the monitoring period, performing first processing including:
determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and
responsive to determining that there have been the specified number of the occurrences of the predefined event with respect to the first data portion of the application, recording a pattern of I/O workload for the first data portion in accordance with the occurrences of the predefined event, and
wherein the first data portion is a first object in a database, and the first object includes a plurality of extents, and wherein the pattern indicates that the plurality of extents are included in a hotspot denoting high I/O workload, the pattern including location information for each of the plurality of extents identifying a storage device location of said each extent, and wherein said recording includes storing the plurality of extents in the database.

16. A computer readable medium comprising code stored thereon that, when executed, performs a method of identifying I/O workload patterns comprising:
monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and
at the end of the monitoring period, performing first processing including:
determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and
responsive to determining that there have been the specified number of the occurrences of the predefined event with respect to the first data portion of the application, recording a pattern of I/O workload for the first data portion in accordance with the occurrences of the predefined event, and
wherein the first data portion is a first object in a database, and the first object includes a plurality of extents, and wherein the pattern indicates that the plurality of extents are included in a hotspot denoting high I/O workload, the pattern including location information for each of the plurality of extents identifying a storage device location of said each extent, and wherein said recording includes storing the plurality of extents in the database.

17. The computer readable medium of claim 16, wherein said recording includes:
recording, for each occurrence of the specified number of occurrences, information including a date and time of said each occurrence, information identifying the first data portion, information identifying a particular one of more of the plurality of data storage KPIs that are violated, a current value of each of the particular one or more of the plurality of data storage KPIs violated, and a current value of the application KPI for the application in said each occurrence.

18. The computer readable medium of claim 17, wherein said recording includes recording information identifying whether each occurrence of the specified number of occurrences occurred within any one or more of: a same hour, a same day, a same week and a same month.

19. A computer readable medium comprising code stored thereon that, when executed, performs a method of identifying I/O workload patterns comprising:
monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and
at the end of the monitoring period, performing first processing including:
determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event, and wherein said recording includes:

recording, for each occurrence of the specified number of occurrences, information including a date and time of said each occurrence, information identifying the first data portion, information identifying a particular one of more of the plurality of data storage KPIs that are violated, a current value of each of the particular one or more of the plurality of data storage KPIs violated, and a current value of the application KPI for the application in said each occurrence, and wherein the method further includes:

generating a hint provided as an input to a data storage optimizer, wherein the hint indicates to mark the first data portion of the application for data movement in accordance with the pattern.

20. A computer readable medium comprising code stored thereon that, when executed, performs a method of identifying I/O workload patterns comprising:

monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including:

determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event, wherein the plurality of data storage KPIs include any of: latency, data throughput, and I/O rate and wherein the plurality of data storage KPIs include a first set of KPIs for read I/O operations and a second set of KPIs for write I/O operations.

21. A system comprising:

one or more processors; and a memory comprising code stored thereon that, when executed by at least a first of the one or more processors, performs a method of identifying I/O workload patterns comprising:

monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including:

determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event, and wherein said recording includes:

recording, for each occurrence of the specified number of occurrences, information including a date and time of said each occurrence, information identifying the first data portion, information identifying a particular one of more of the plurality of data storage KPIs that are violated, a current value of each of the particular one or more of the plurality of data storage KPIs violated, and a current value of the application KPI for the application in said each occurrence, and wherein the method further includes:

generating a hint provided as an input to a data storage optimizer, wherein the hint indicates to mark the first data portion of the application for data movement in accordance with the pattern.

22. A system comprising:

one or more processors; and a memory comprising code stored thereon that, when executed by at least a first of the one or more processors, performs a method of identifying I/O workload patterns comprising:

monitoring a plurality of key performance indicators (KPIs) for a monitoring period, wherein the plurality of KPIs includes an application KPI for an application, and wherein the plurality of KPIs includes a plurality of data storage KPIs, wherein a plurality of data portions of the application have a plurality of associated sets of the plurality of data storage KPIs and said monitoring monitors a different one of the associated sets of the plurality of data storage KPIs for each of the plurality of data portions for the monitoring period; and at the end of the monitoring period, performing first processing including:

determining whether there have been a specified number of occurrences of a predefined event with respect to a first of the plurality of data portions for the application, wherein the predefined event is a violation of the application KPI for the application and also a violation of at least one of the plurality of data storage KPIs for the first data portion of the application; and responsive to determining that there have been the specified number of the occurrences of the predefined event with respect to the first data portion of the application, recording a pattern of I/O workload for the first data portion in accordance with the occurrences of the predefined event, wherein the plurality of data storage KPIs include any of: latency, data throughput, and I/O rate and wherein the plurality of data storage KPIs include a first set of KPIs for read I/O operations and a second set of KPIs for write I/O operations.

* * * * *